United States Patent [19]
Ueda et al.

[11] Patent Number: 5,372,623
[45] Date of Patent: Dec. 13, 1994

[54] METHOD AND APPARATUS FOR FORMING GLASS CONTAINERS WITH REINFORCED INNER SURFACES

[75] Inventors: Sadao Ueda, Kawasaki; Kiyoshi Chiku, Yokosuka; Kouichi Takahashi, Yokohama; Kazumoto Ohshiba, Tokyo, all of Japan

[73] Assignee: Toyo Glass Company, Limited, Tokyo, Japan

[21] Appl. No.: 979,228

[22] Filed: Nov. 20, 1992

[30] Foreign Application Priority Data

Nov. 22, 1991 [JP] Japan .................. 3-332723

[51] Int. Cl.$^5$ .................... C03B 9/00; C03B 9/30
[52] U.S. Cl. .................... 65/68; 65/30.1; 65/82; 65/104; 65/120; 65/261; 65/262; 65/300; 65/229
[58] Field of Search .................. 65/65, 68, 69, 82, 84, 65/88, 119, 60.1, 60.4, 60.5, 60.8, 105, 261, 300, 216, 229, 232, 235, 262, 30.1, 104, 120

[56] References Cited

U.S. PATENT DOCUMENTS

| | | | |
|---|---|---|---|
| Re. 26,760 | 1/1970 | Mahoney | 65/30.1 |
| 2,123,145 | 7/1938 | Peiler | 65/262 |
| 2,261,689 | 11/1941 | Lyle et al. | 65/30.1 |
| 2,261,690 | 11/1941 | Lyle et al. | 65/30.1 |
| 2,261,691 | 11/1941 | Lyle et al. | 65/30.1 |
| 3,215,515 | 11/1965 | Bacon | 65/30.1 |
| 3,249,246 | 5/1966 | Mahoney . | |
| 3,337,321 | 8/1967 | Teague, Jr. et al. | 65/30.1 |
| 3,529,991 | 9/1970 | Shonebarger et al. | 65/30.1 |
| 3,642,461 | 2/1972 | Heaton | 65/105 |
| 3,656,922 | 4/1972 | Budd | 65/119 |
| 3,687,651 | 8/1972 | Scholes | 65/60.1 |
| 3,827,871 | 8/1974 | Budd | 65/30.1 |
| 4,493,722 | 1/1985 | Ono | 65/79 |
| 4,708,730 | 11/1987 | Zeigler et al. | 65/84 |

OTHER PUBLICATIONS

The Glass Technique Research Study Class (Glass Shaping Technique), The Glass Manufacturers' Association of Japan, Mar. 1990, pp. 124–126.

Primary Examiner—W. Gary Jones
Assistant Examiner—Steven P. Griffin
Attorney, Agent, or Firm—Wenderoth, Lind & Ponack

[57] ABSTRACT

This invention relates to a method and apparatus for forming a glass container by a press-and-blow system wherein the glass container is provided with a reinforced inner surface. According to the inventive method, fuel gas or a gaseous boron or silicon compound is burnt or otherwise reacted inside a parison after the parison molded in the blank mold is transferred to the finish mold. The burning or other reaction of the fuel gas or gaseous boron or silicon compounds can be carried out just prior to the final blow-molding step in which the parison is blow molded into its final shape, simultaneous with the final blow-molding step, or just after the final blow-molding step. The apparatus of the present invention includes a finish mold provided with a blow head which includes a low selector valve. The low selector valve is open during combustion or other reaction within the parison and is automatically closed during the final blow-molding step by the pressure of the compressed air used in the final blow-molding.

9 Claims, 5 Drawing Sheets

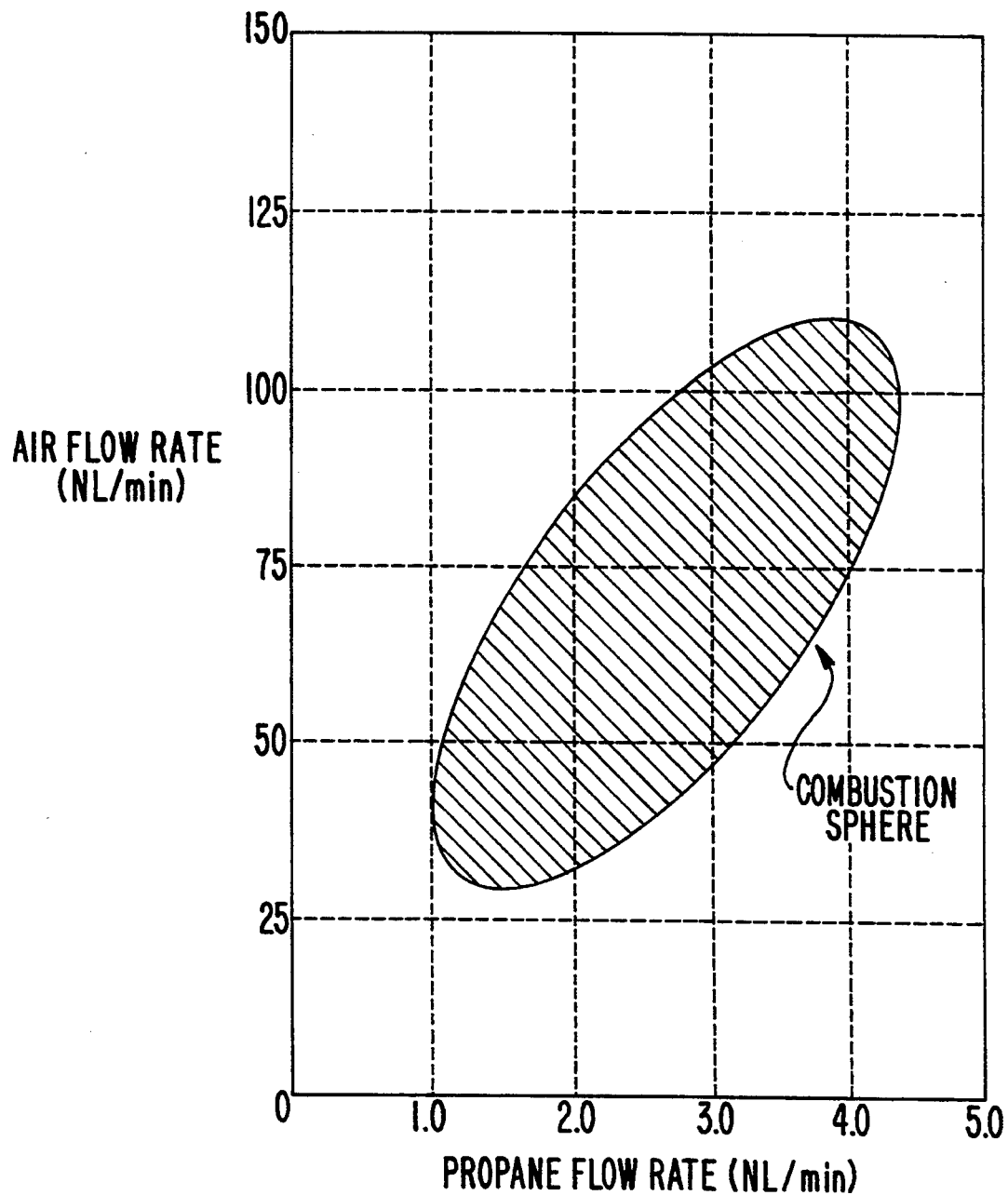

METHOD AND APPARATUS FOR FORMING GLASS CONTAINERS WITH REINFORCED INNER SURFACES

BACKGROUND OF THE INVENTION

1. Field of the Invention

This invention relates to a method and apparatus for forming glass containers having reinforced inner surfaces when the glass containers are produced by a press-and-blow system.

2. Description of the Prior Art

Prior art methods for shaping glass containers include a blow-and-blow system and a press-and-blow system.

FIGS. 1a-1f are schematic views showing a glass gob and molds at various stages in the shaping process of a glass container shaped by the press-and-blow system. The production process proceeds from the first to the sixth stages depicted successively in FIGS. 1a-1f. In the first stage, a glass gob 2 is charged into a blank mold 1 through a funnel 4, and a plunger 3 is situated in a stand-by position below the gob 2. In the second stage, the gob 2 is disposed inside the blank mold 1 and a baffle 6 is fitted thereover. In the third stage (or pressing stage), the plunger 3 is extended into the gob 2 to form the gob generally into the shape of a container, such container-shaped mass being called a parison. In the fourth stage, this parison 7 is transferred by a neck ring mold 5 to a finish mold 8 which has a bottom plate 9. In the fifth stage, the neck ring mold 5 is removed and the parison 7 is disposed in the finish mold 8. In the sixth stage (or final blowing stage), a blow head 10 is fitted to the finish mold 8, and compressed air a is blown into the parison 7 through the blow head 10 to form a glass container having the desired final shape.

The press-and-blow system has, to date, been the preferred system for shaping lightweight containers because it is capable of easily providing a uniform thickness distribution for the containers. However, in the press-and-blow system the parison is produced by pressing the plunger into the gob in the blank mold. Accordingly, the inner surface of the parison tends to have many fine scratches due to contact with the plunger and also its temperature tends to drop.

FIG. 6 shows exemplary values of the inner surface temperature of the parison in the press-and-blow system in comparison with those in the blow-and-blow system. It can be understood from this diagram that a remarkable temperature drop occurs during pressing of the plunger into the gob in the press-and-blow system.

Traces of the fine scratches on the inner surface of the parison remain even after the final blowing stage has been completed. The presence of these fine scratches tends to reduce the inner surface strength of the containers produced. Furthermore, the drop in the inner surface temperature of the parison exerts adverse influence on the reheating time and the molding of the parison.

The blow-and-blow system does not have a pressing step. Therefore, the containers produced thereby have a high inner surface strength. However, such containers do not have a uniform thickness distribution, thereby making it difficult to reduce the weight of the containers.

Accordingly, the press-and-blow system has generally been adopted in order to reduce the weight of the containers. In addition, in order to improve the outer surface strength of the containers, so-called hot-end coating or cold-end coating has been employed. However, there has heretofore been no particular method of retaining or increasing the inner surface strength of the containers.

Thus, in the press-and-blow system, fine scratches on the inner surface of the parison caused by contact between the gob and the plunger and the drop of the inner surface temperature of the parison have remarkably lowered the strength of the inner surfaces of the glass containers produced. Accordingly, a method and apparatus for preventing such troubles have long been anticipated.

SUMMARY OF THE INVENTION

The present invention has as its object to provide a press-and-blow system which will overcome the above shortcomings of the prior art press-and-blow systems.

The present invention relates to a method of reinforcing the inner surfaces of glass containers by a press-and-blow system or process, wherein a fuel gas or a gaseous boron or silicon compound is burnt or otherwise reacted inside the parison during the sixth stage of the process. The invention further relates to a finish mold used for practicing the above methods, the blow head of which is provided with a low selector valve, which is to be open during burning or reacting of the fuel gas or the gaseous boron or silicon compound to attain efficient combustion or reaction, and closed during final blowing to attain complete blow molding.

In the present invention, the fuel gas blown into the parison raises the temperature of the inner surface of the parison which has been lowered due to contact with the plunger, and smoothens the fine defects on the inner surface. This results in an increase in the strength of the inner surface of the parison and a finishing of the parison into a desirable final shape. The gaseous boron or silicon compound, blown into the parison, functions in a similar manner as the fuel gas, and forms a reaction layer of boron or silica on the inner surface to further improve the strength thereof. Furthermore, the provision of the low selector valve on the blow head makes the gas combustion or reaction efficient, and causes the parison to be provided with a desirable final shape by the blow pressure.

BRIEF DESCRIPTION OF THE DRAWINGS

FIG. 5 shows a graph of propane gas flow rates versus air flow rates which highlights ratios which generally provide good combustion or reaction inside the parison.

DETAILED DESCRIPTION OF THE INVENTION

Figure 1A:
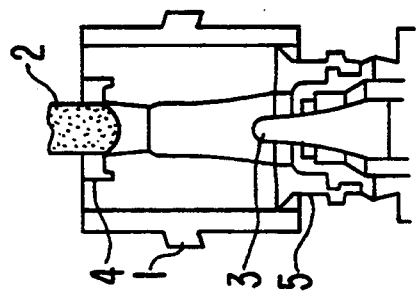
FIGS. 1a-1f are schematic views illustrating successive steps of a glass bottle shaping method used in a conventional press-and-blow system.
Figure 1B:
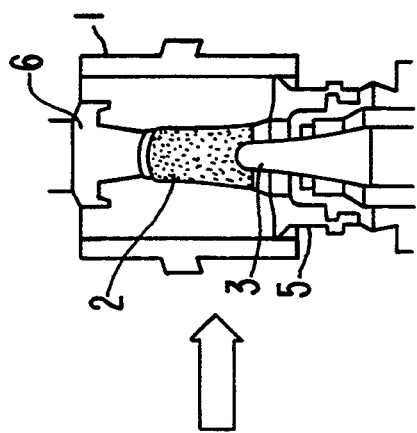
Figure 1C:
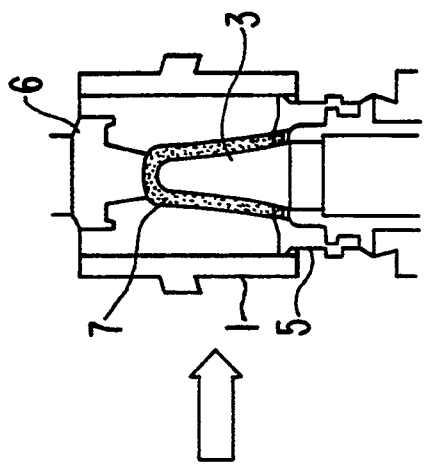
Figure 1D:
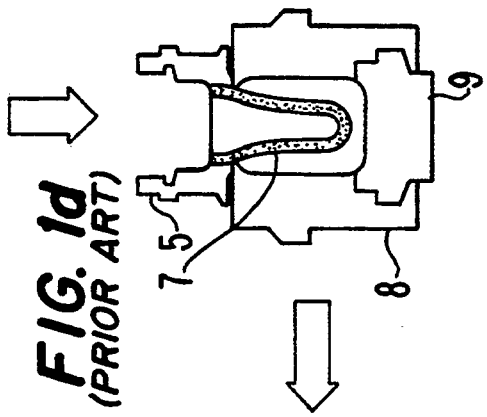
Figure 1E:
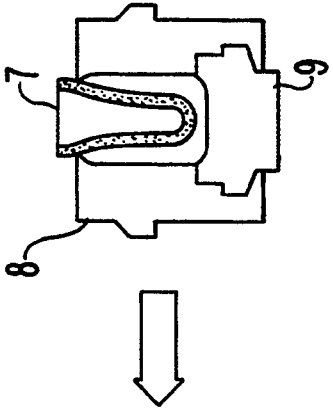
Figure 1F:
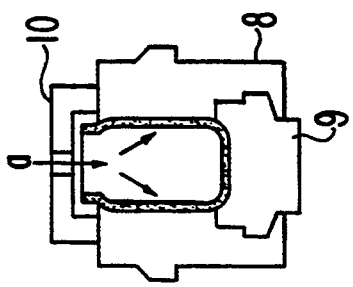

The method according to the present invention is substantially identical to the method used in the conventional press-and-blow system and discussed above in connection with FIGS. 1a–1f, except that in the present inventive method, the sixth stage (i.e. as illustrated in FIG. 1f) is modified. Specifically, a fuel gas is burnt or otherwise reacted inside the parison during the sixth stage in which final blowing of the parison is carried out. The burning or reacting of the fuel gas may occur either simultaneously with, or preceding or following the blowing, so as to raise the temperature of the inner surface of the parison to thereby make the inner surface smooth and reinforce the inner surface.

Alternatively to burning of the fuel gas inside the parison, a gaseous boron or silicon compound can be burnt or otherwise reacted inside the parison, preceding or following the final blowing, so as to raise the temperature of the inner surface and to make smooth and to simultaneously reinforce the inner surface by forming a reaction layer of boron or silica on the inner surface. It is possible to mix the gaseous boron or silicon compound with the compressed air which is blown into the parison during final blowing, so as to shape the parison into a glass container and simultaneously form the reaction layer.

Figure 2:
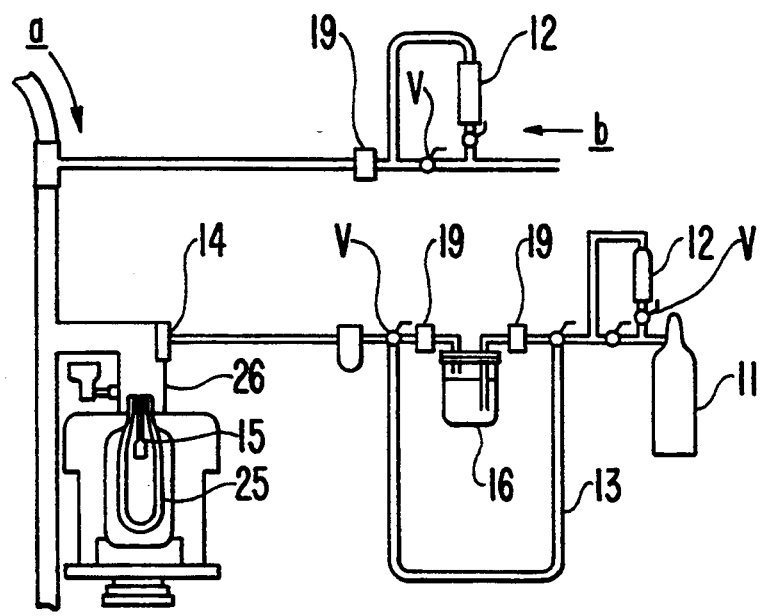
FIG. 2 is an explanatory view of a piping arrangement for practicing the method of the present invention.
Figure 3:
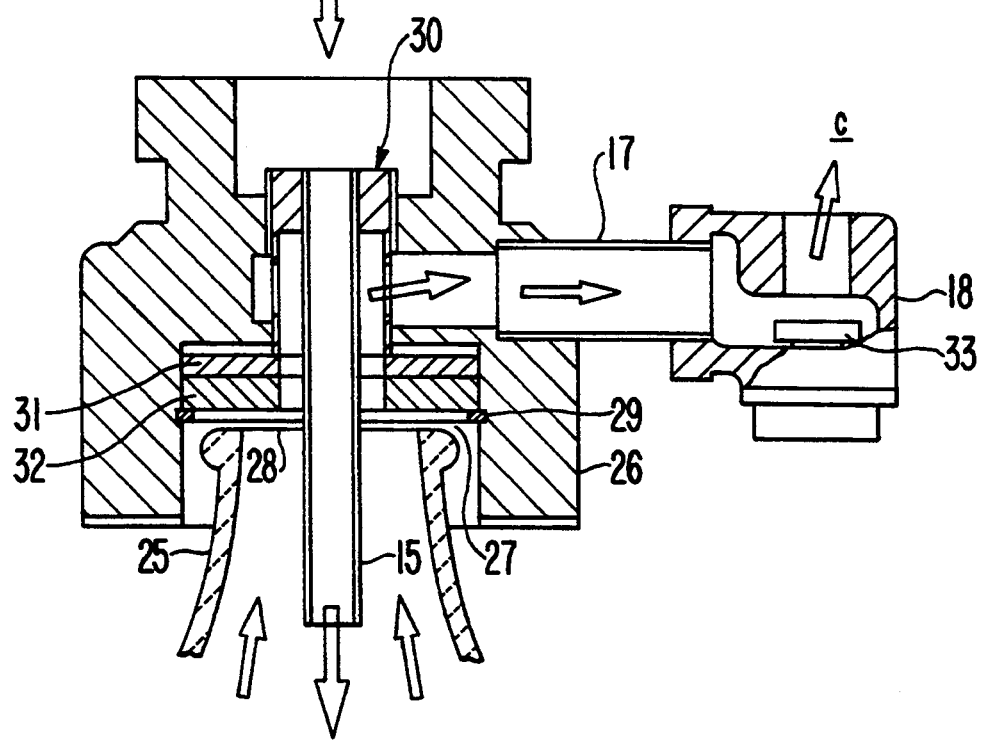
FIG. 3 is a schematic sectional view of a blow head according to the present invention.
Figure 4A:
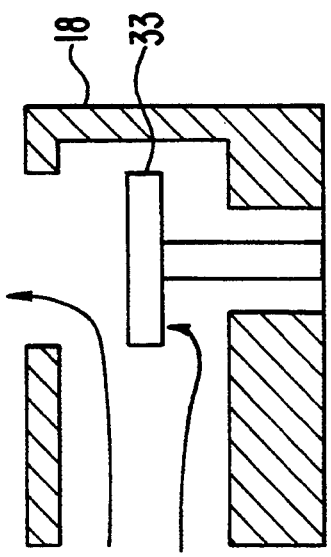
FIGS. 4a-4c are schematic sectional views of a low selector valve of the blow head according to the present invention showing the valve at various operational positions.
Figure 4B:
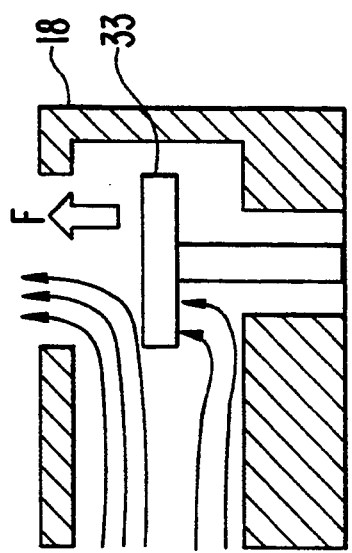
Figure 4C:
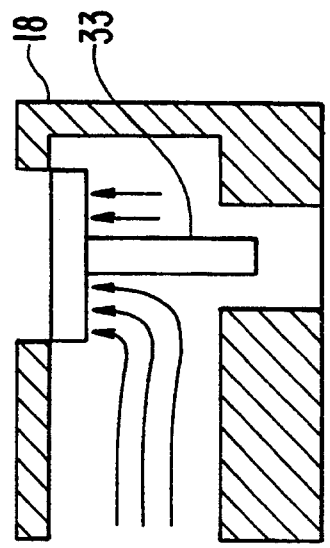
Figure 6:
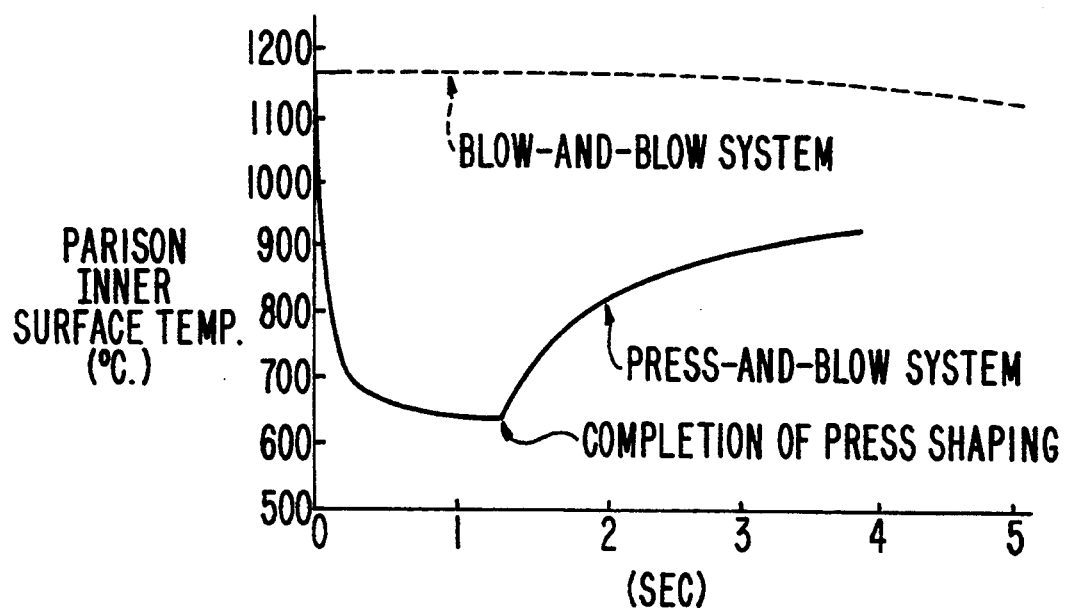
FIG. 6 illustrates the change in inner surface temperature of a parison over time in a conventional blow-and-blow system and in the conventional press-and-blow system.

As shown in FIGS. 2–4, in practicing the sixth stage of the method according to the present invention, a finish mold is used which includes a blow head 26. The blow head 26 has a blow nozzle 15 extending therethrough for blowing pressurized air into the parison. An exhaust pipe 17 having a sectional area greater than that of the blow nozzle 15 extends radially from the blow nozzle 15 and is provided at its distal end with a low selector valve 18. The low selector valve 18 is open during combustion or reaction (as shown in FIG. 3) and is closed during the final blow due to the pressure increase created by the introduction of compressed air (as shown in FIG. 4c).

FIG. 2 shows an arrangement which can be utilized with the method of the present invention. In FIG. 2, reference character a represents pressurized air for use in the final blow, reference character b represents combustion air (or reaction air) which must be provided at least when the burning occurs before or after the final blowing with the compressed air a, reference character 11 represents a source tank, and reference character 25 represents the parison. When the burning or other reacting inside the parison 25 is to be carried out by burning fuel gas, the source tank 11 can be a liquid propane gas (LPG) tank, and the LPG will be directed from the LPG tank 11 through the pipe 13 (i.e. to bypass the tank 16) and to the blow head arm 14 which is in communication with the blow head 26, where the LPG is proportionally mixed with combustion air b and/or compressed air a as it is directed into the parison 25 through the blow nozzle 15.

Alternatively, when a gaseous boron solution is to be burnt or reacted inside the parison 25, the source tank 11 can be a nitrogen tank. Nitrogen from the nitrogen tank 11 is directed toward the blow head arm 14 through the tank 16 which will contain, in this case, a trimethyl borate solution. Of course, flow meters 12 and various valves V, including electromagnetic valves 19, are provided for regulating the flow rates and proportions of the source fluid (i.e. LPG or nitrogen) and the combustion air.

When the propane gas or trimethyl borate gas is charged through the blow nozzle 15 and into the parison 25, it is spontaneously ignited by heat retained by the parison 25 or is otherwise reacted inside the parison 25 (e.g. by hydrolysis and pyrolysis). The resulting exhaust gas c (see FIG. 3) will pass through the low selector valve 18 to be discharged to the outside. When the compressed air (or final blow air) a is charged into the parison 25 through the blow nozzle 15, the low selector valve 18 is automatically closed (as shown in FIG. 4c) due to the high flow rate of the final blow air a through the exhaust pipe 17, so that the parison can be properly blow-molded to its final shape. Thus, when the combustion or other reaction of the fuel gas or gaseous boron or silicon occurs in the parison 25 prior to the final blowing step, exhaust gas c is discharged through the low selector valve 18 during combustion and the final blow air a is charged into the parison 25 after the combustion or reaction is completed, thereby closing the low selector valve 18 to allow proper blow-molding of the parison 25 into its final shape.

As discussed above, the flow rates of the combustion air b and fuel gas or gaseous boron or silicon are controlled to provide for proper mixing ratios necessary for proper combustion or other reaction within the parison 25. FIG. 5 shows a graph of air flow rates versus propane flow rates for the method of the present invention, wherein the combustion shown in FIG. 5 illustrates appropriate ranges of the flow rates for proper combustion or other reaction in the parison 25. In addition, as noted above, to provide proper combustion or other reaction conditions inside the parison 25, the cross-sectional area of the exhaust passage 17 should be greater than the cross-sectional area of the blow nozzle 15.

Although a preferred embodiment of the present inventive method contemplates nitrogen gas as the carrier gas for the trimethyl borate gas, propane or other fuel gases can be used in place of the nitrogen gas as the carrier gas. Furthermore, it is unnecessary to provide combustion air b when gaseous boron or silicon compounds are mixed with the final blow air (or compressed air) a during reaction.

The present invention further concerns the finish mold described above for use in practicing the method of the present invention. The finish mold is provided with the blow head 26 which includes the exhaust port 17 having the low selector valve 18. During burning or other reacting of the gas, the low selector valve 18 is open, but during blow molding of the parison 25, the low selector valve 18 is closed. When combustion and blow molding occur simultaneously, the low selector valve 18 is maintained in a closed position until the blow molding has been completed, at which time the low selector valve 18 is opened and the exhaust gases c released. In this regard, it should be noted that a small space 27 is maintained between a mouth 28 of the parison and a stopper ring 29. This space 27 allows a certain amount of release of compressed air a when the blow molding occurs before or after the combustion or other reaction in the parison 25, and allows for release of some of the exhaust gases c, along with compressed air a when the blow molding and reaction are carried out simultaneously. Conventional blow heads often include in sidewalls thereof a small opening in addition to a small opening above the mouth of the parison such that a conventional blow head can be used when the reaction and blow molding are carried out simultaneously. Further in FIG. 3, the reference character 30 represents a nozzle holder for securing nozzle 15, and reference characters 31 and 32 represent spacer plates.

FIGS. 4a, 4b and 4c schematically illustrate the functioning of the low selector valve 18. As shown in FIG. 4a, before the start of blow molding, the air flow is weak or slow so that a valve float 33 is maintained in positional equilibrium i.e. in an open position. FIG. 4b illustrates the float 33 being urged toward the closed position (at which it is effective to close the exhaust passage 17) at the beginning of blow molding because the air flow by the upper surface of the float 33 is swift due to the high air pressure created during blow molding, such that the atmospheric pressure incident on the upper surface of the float 33 is lower than that incident on the lower surface thereof. FIG. 4c illustrates the valve 18 in the closed position during blow molding.

Next, examples of the present inventive method will be described, as will comparative examples of the conventional press-and-blow method which does not include combustion inside the parison.

EXAMPLE 1

Propane gas at a flow rate of 4 NL/min was mixed with combustion air at a flow rate of 100 NL/min and was charged into a parison. After the mixed gas was burnt for 1.8 seconds, the final blow-molding step was carried out for 1.3 seconds to inflate the parison to its final shape, and glass containers having a capacity of 500 ml were produced.

EXAMPLE 2

Nitrogen gas as a carrier gas was blown into a trimethyl borate solution tank heated to 40° C., at a flow rate of 5 NL/min and the resultant trimethyl borate gas was charged into the parison and was burnt for 1.8 seconds. Then the final blow-molding step was carried out for 1.3 seconds, and glass containers having a capacity of 500 ml were produced.

EXAMPLE 3

Nitrogen gas as a carrier gas was blown into a trimethyl borate solution tank heated to 40° C. at a flow rate of 5 NL/min and the resultant trimethyl borate gas was blown into the parison for 2.5 seconds. The final blow-molding was carried out simultaneously with charging of the trimethyl borates gas into the parison by charging compressed air a into the parison along with the trimethyl borate gas. The trimethyl borate gas underwent pyrolysis and hydrolysis with water in air, and then reacted with the glass of the inner surface of the parison 25 to form a reaction layer thereon. Glass containers having a capacity of 900 ml were produced.

COMPARATIVE EXAMPLE 1

The conventional final blow-molding step was carried out for 2.5 seconds without carrying out the combustion process of the present invention, and control glass containers having a capacity of 500 ml were produced.

COMPARATIVE EXAMPLE 2

The conventional final blow-molding step was carried out for 2.5 seconds without carrying out the combustion process of the present invention, and control glass containers having a capacity of 900 ml were produced.

Figure 7:
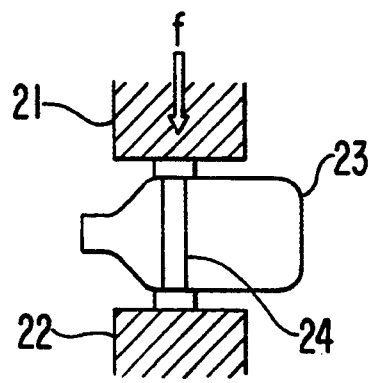
FIG. 7 is a schematic view illustrating a transverse load testing method for a glass container.

Transverse load strength tests were carried out according to a testing method depicted in FIG. 7 for each of the five containers produced by the methods of Example 1, 2 and 3 and Comparative Examples 1 and 2. In FIG. 7, reference numerals 21 and 22 represent load heads of a material testing machine, reference numeral 23 represents a sample container, and reference numeral 24 represents cellophane tape. Also mechanical impact tests were carried out for the shoulder of each container by the method of JIS S/2303. Only cellophane tape was wound at the load or impact position of the outer surface of a container so that the container was broken from its inner surface. These test results are shown in Tables 1, 2, 3 and 4. As indicated by the higher numeric values, the containers treated with propane or trimethyl borate gas in the present invention have a far greater strength than the control containers. Since each container was broken from the inner surface in these tests, it is obvious that the treatment of the present invention is effective for increasing the strength of the inner surface of glass containers.

TABLE 1

Transverse load test results
number of samples = 12 each, unit: kgf

| | Kinds of samples | | |
| --- | --- | --- | --- |
| | Comp. Example 1 | Example 1 | Example 2 |
| mean value | 368 | 434 | 577 |
| standard deviation | 131.0 | 82.3 | 137.0 |

TABLE 2

Mechanical impact test results
number of samples = 12 each, unit: kgf cm

| | Kinds of samples | | |
| --- | --- | --- | --- |
| | Comp. Example 1 | Example 1 | Example 2 |
| mean value | 14.7 | 20.1 | 22.4 |
| standard deviation | 5.82 | 7.79 | 4.24 |

TABLE 3

Transverse load test results
number of examples = 10 each, unit: kgf

| | Kinds of samples | |
| --- | --- | --- |
| | Comp. Example 2 | Example 3 |
| mean value | 298 | 431 |
| standard deviation | 73.5 | 120.8 |

TABLE 4

Mechanical impact test results
number of samples = 10 each, unit: kgf cm

| | Kinds of samples | |
| --- | --- | --- |
| | Comp. Example 2 | Example 3 |
| mean value | 7.25 | 9.55 |
| standard deviation | 4.05 | 4.03 |

The present invention, which has made it possible to increase the inner surface strength of glass containers, in cooperation with the conventional methods of increasing the outer surface strength of glass containers, will make a great contribution to the reduction in weight of glass containers.

Besides the Examples given above, experiments were carried out using fuel gases such as methanol, ethanol, and methane, in place of propane gas, and substantially the same effects as tabulated above were obtained.

We claim:

1. A method of molding a glass container, comprising the steps of:
    positioning a glass gob in a mold;
    forcing a plunger into said glass gob in order to form a substantially container-shaped parison;
    blowing compressed air into said parison to expand said parison into a glass container having a desired final shape;
    injecting a reaction gas into said parison such that said reaction gas reacts in said parison; and
    wherein said reaction gas comprises propane and is caused to combust in said parison.

2. A method of molding a glass container, comprising the steps of:
    positioning a glass gob in a mold;
    forcing a plunger into said glass gob in order to form a substantially container-shaped parison;
    blowing compressed air into said parison to expand said parison into a glass container having a desired final shape;
    injecting a reaction gas into said parison such that said reaction gas reacts in said parison; and
    wherein said reaction gas comprises a gaseous silicon compound.

3. A method of molding a glass container, comprising the steps of:
    positioning a glass gob in a mold;
    forcing a plunger into said glass gob in order to form a substantially container-shaped parison;
    blowing compressed air into said parison to expand said parison into a glass container having a desired final shape;
    injecting a reaction gas into said parison such that said reaction gas reacts in said parison; and
    said step of injecting is carried out prior to said step of blowing.

4. A finish mold for use in forming a glass container in a press-and-blow method, comprising:
    a finish mold base portion;
    a blow head mounted to said finish mold base portion, said blow head having a blow nozzle formed therethrough for allowing compressed air to be blown into a parison positioned in said finish mold base portion and an exhaust passage for allowing exhaust gases to be discharged from the parison, said exhaust passage having a cross-sectional area which is greater than a cross-sectional area of said blow nozzle; and
    a low selector valve means, comprising a valve float having an upper surface and a lower surface and being movably mounted in said exhaust passage for movement between an open position and a closed position, for closing said exhaust passage when compressed air being discharged through said exhaust passage causes surrounding atmospheric pressure acting on said lower surface of said valve float to become greater by a given amount than surrounding atmospheric pressure acting on said upper surface of said valve float, and for maintaining said exhaust passage open to allow exhaust gases to be discharged through said exhaust passage when the surrounding atmospheric pressure acting on said lower surface of said valve float is not greater by said given amount than the surrounding atmospheric pressure acting on said upper surface of said valve float.

5. A method of molding a glass container, comprising the steps of:
    positioning a glass gob in a mold;
    forcing a plunger into said glass gob in order to form a substantially container-shaped parison;
    blowing compressed air into said parison to expand said parison into a glass container having a desired final shape;
    injecting a reaction gas into said parison such that said reaction gas reacts in said parison; and
    wherein said step of injecting comprises directing a carrier gas through a trimethyl borate solution to obtain a mixture of the carrier gas and a trimethyl borate gas arising from said trimethyl borate solution, and then directing the mixture of the trimethyl borate gas and the carrier gas into said parison.

6. A method as recited in claim 5, wherein said carrier gas comprises nitrogen gas.

7. A method as recited in claim 6, wherein in sad step of injecting, a mixture of trimethyl borate gas, nitrogen gas and air is fed into said parison.

8. A method as recited in claim 5, wherein said carrier gas comprises fuel gas.

9. A method as recited in claim 8, wherein in said step of injecting, a mixture of trimethyl borate gas, fuel gas and air is fed into said parison.

* * * * *